US008416786B2

(12) United States Patent
Li

(10) Patent No.: US 8,416,786 B2
(45) Date of Patent: Apr. 9, 2013

(54) DATA TRANSPORT CONTAINER FOR TRANSFERRING DATA IN A HIGH SPEED INTERNET PROTOCOL NETWORK

(75) Inventor: Hui Li, Hannover (DE)

(73) Assignee: Thomson Licensing, Issy-les-Moulineaux (FR)

(*) Notice: Subject to any disclaimer, the term of this patent is extended or adjusted under 35 U.S.C. 154(b) by 64 days.

(21) Appl. No.: 12/380,714

(22) Filed: Mar. 3, 2009

(65) Prior Publication Data
US 2009/0219919 A1 Sep. 3, 2009

(30) Foreign Application Priority Data

Mar. 3, 2008 (EP) .................................... 08300132

(51) Int. Cl.
*H04L 12/28* (2006.01)
*H04L 12/56* (2006.01)

(52) U.S. Cl. ........... 370/395.5; 370/395.52; 370/395.53; 370/395.63; 370/395.64; 725/98; 725/110; 725/118; 725/148

(58) Field of Classification Search ................ 370/265, 370/395.5, 395.52, 395.53, 395.63, 395.64; 725/110, 98, 118, 148
See application file for complete search history.

(56) References Cited

U.S. PATENT DOCUMENTS

| 6,185,737 | B1* | 2/2001 | Northcutt et al. ............. 725/110 |
| 6,477,595 | B1* | 11/2002 | Cohen et al. .................. 710/105 |
| 6,760,916 | B2* | 7/2004 | Holtz et al. .................... 725/34 |
| 7,349,386 | B1* | 3/2008 | Gou .............................. 370/356 |
| 7,869,429 | B2* | 1/2011 | Toyomura et al. ............. 370/389 |
| 2002/0090086 | A1* | 7/2002 | Van Rijnsoever ............. 380/207 |
| 2003/0093550 | A1* | 5/2003 | Lebizay et al. ............... 709/236 |
| 2003/0126294 | A1* | 7/2003 | Thorsteinson et al. ........ 709/247 |
| 2005/0068951 | A1* | 3/2005 | Rivard et al. .................. 370/389 |
| 2005/0254776 | A1* | 11/2005 | Morrison et al. ............... 386/46 |
| 2005/0286520 | A1* | 12/2005 | Oz et al. ........................ 370/389 |
| 2006/0109805 | A1* | 5/2006 | Malamal Vadakital et al. ............................. 370/299 |
| 2007/0286211 | A1* | 12/2007 | Toyomura et al. ........ 370/395.64 |
| 2008/0159416 | A1* | 7/2008 | Melick et al. ................. 375/259 |
| 2009/0154475 | A1* | 6/2009 | Lautenschlaeger ........... 370/400 |
| 2009/0219919 | A1* | 9/2009 | Li ................................. 370/351 |

FOREIGN PATENT DOCUMENTS

EP 2395727 A1 * 12/2011

OTHER PUBLICATIONS

French Search Report dated Nov. 8, 2008.

* cited by examiner

*Primary Examiner* — Michael Thier
*Assistant Examiner* — Benjamin H Elliott, IV
(74) *Attorney, Agent, or Firm* — Myers Wolin, LLC

(57) ABSTRACT

The present invention relates to a data transport container for transferring a number n of different types of data in an Internet Protocol network. The number n is superior or equal to 2, and data is generated as Ethernet Jumbo packets, wherein the data transport container is an Internet Protocol packet. The invention also relates to a source device and to a destination device respectively for transferring and receiving such a data transport containers. At least, the invention relates to a method for transferring n different types of data being generated as Gigabit Ethernet RTP-UDP-IP jumbo packets. Both devices are to be used in a method as mentioned above.

9 Claims, 7 Drawing Sheets

DATA TRANSPORT CONTAINER FOR TRANSFERRING DATA IN A HIGH SPEED INTERNET PROTOCOL NETWORK

This application claims the benefit, under 35 U.S.C. §119 of European Patent Application No. 08300132.1, filed Mar. 3, 2008.

FIELD OF THE INVENTION

The invention concerns a data transport container for transferring data in an Internet Protocol (IP) network. The data transport container has a particular interest for transferring simultaneously at least two different types of data as Gigabit Ethernet RTP-UDP-IP jumbo packets, for example, two types of data being generated by a single source sent in a network of subscriber stations. Furthermore, the invention also relates to a source device and to a destination device respectively for transferring and receiving such a data transport containers. At least, the invention relates to a method for transferring different types of data being generated as Gigabit Ethernet RTP-UDP-IP jumbo packets. Both devices are to be used in a method as mentioned above.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Gigabit Ethernet (GigE) has rapidly gained prominence and acceptance as the new step in evolution of networks. Relatively low-cost, high-speed, and interoperable with today's de facto standard, 100 Mbps Fast Ethernet, are just a few of GigE's promises. For many network planners, it is really only a matter of time before they adopt GigE.

Although Gigabit Ethernet is interoperable with 10/100 Mbps, there are some important differences that bear careful consideration. One of the most important is the absence of any standard Maximum Transmission Unit or MTU. The 1500 bytes standard MTU of 10 and 100 Mbps networks has been replaced with no standard at all. Packets on Gigabit Ethernet can be any size supported by network vendors, varying from 1500 bytes to over 16000 bytes. Vendors are constrained by the component manufacturers who typically limit largest supported frame size to around 9000 bytes.

While the benefits of so-called jumbo packets are significant: jumbo packets can more than double accessible bandwidth on today's networks compared to using smaller 1500 bytes packets, there are some hidden perils. Due to the lack of standard MTU values, MTU conflicts may hamper 100-Mbps-to-Gigabit transitions. For example, various forms of MTU conflict, such as black holes, can devastate network performance.

By sending oversize packets to an end-host and receiving messages back from intermediate interfaces, a transmitting host can discover the path MTU to a specific end-host, and adjust its traffic patterns accordingly. If not properly configured, or if messages are indiscriminately blocked on Layer 3 interfaces, necessary messages will not find their way to a source interface. These devices are referred to as black holes.

The term "jumbo" has typically been applied to any network unit (frame, packet, MTU) that is greater than the 10/100 Mbps Ethernet standard: at Layer 3 (packets and MTU), the standard size is 1500 bytes. Jumbo packets are one of the obvious differences between 100 Mbps and GigE. However, there is also a looming issue in that Gigabit Ethernet standard has no default Maximum Transmission Unit (MTU). MTU is a Layer 3 parameter that controls the maximum packet size allowed on the network. For 10 and 100 Mbps Ethernet, the standards (RFC 894, 895) clearly set the largest MTU to 1500 bytes and almost all Ethernet interface cards defaulted to it.

But, in current implementations, GigE data transfer performance is strongly dependent on MTU: recent studies have shown that jumbo packets permit most hosts to send data at much higher transfer rates than the smaller 1500 byte packets. In this context, there is a need to multiplex jumbo packets generated by different sources into RTP packets.

In the state of the art, it is well known to compact multi-packets into a single RTP packet, in order to reduce header overhead or to wrap multiple user data into a single RTP packet, in order to transfer multi-user data within a single RTP session. But, these existing RTP multiplexing methods are all based on standard packet RTP applications. They can't be used when different types of data, like video data, audio data, or metadata are transferred in Ethernet Jumbo packets.

Recent application, like for example, HiPerNet cameras can generate various output streams comprising data of different types, such as: DPX wrapped video, AIFF audio signal which maintains time relation with the video content, Intercom audio also presented as AIFF audio, where there is no time relation with the video content and at least, metadata. All these output streams are generated as Ethernet IP-UDP-RTP jumbo packets.

One of the goals of the present invention is to transmit simultaneously these data belonging to different types generated as Ethernet IP-UDP-RTP jumbo packets on a high-speed IP network.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

SUMMARY OF THE INVENTION

The technical problem that present invention intends to solve is to transmit simultaneously data of different types generated as jumbo packets on a high-speed IP network.

Thus, the present invention concerns, according to a first aspect, a data transport container for transferring a number n of different types of data in a high speed Internet Protocol network. The number n is superior or equal to 2. Data is generated as Ethernet Jumbo packets, wherein the data transport container is an Internet Protocol packet. According to the invention, the data transport comprises a succession of Internet Protocol multiplexing logical blocks, each logical block comprises a combination of n Internet Protocol physical packets corresponding to each type of data, and each Internet Protocol physical packet aggregates a predefined number of Ethernet Jumbo packets depending on the type of data it comprises.

The present invention concerns, according to a second aspect, a source device S_DEV for sending a data transport container in a high speed Internet Protocol network according to the invention. The data transport container comprises a number n of different types of data. The number n is superior or equal to 2. Each type of data is generated as Ethernet Jumbo packets. According to the invention, it includes:

means for aggregating a predefined number of Ethernet Jumbo packets comprising a unique type of data into an Internet Protocol physical packet of corresponding type;

means for combining together n Internet Protocol physical packet corresponding to each type of data into an Internet Protocol multiplexing logical block;

means for transmitting a stream comprising the Internet Protocol multiplexing logical blocks on the network.

The present invention concerns, according to a third aspect, a destination device D_DEV for receiving a data transport container according to the invention. The data transport container comprises a number n of different types of data. The number n is superior or equal to 2. Each type of data is generated as Ethernet Jumbo packets. According to the invention, it includes:

means for receiving the stream;

means for filtering the received stream in order to recover Ethernet Jumbo packets corresponding to each type of data.

The present invention concerns, according to a fourth aspect, a method for transferring a number n of different types of data in a high speed Internet Protocol network. The number n is superior or equal to 2, each type of data is generated as Ethernet Jumbo packets. According to the invention, it comprises steps of:

aggregating a predefined number of Ethernet Jumbo packets comprising a unique type of data into an Internet Protocol physical packet of corresponding type;

combining together n Internet Protocol physical packet corresponding to each type of data into an Internet Protocol multiplexing logical block;

transmitting a stream comprising the Internet Protocol multiplexing logical blocks on the network;

receiving the stream;

filtering the received stream in order to recover Ethernet Jumbo packets corresponding to each type of data.

BRIEF DESCRIPTION OF THE DRAWINGS

Embodiments of the invention are described in text form hereinafter and are illustrated with drawings, which show in.

DETAILED DESCRIPTION OF PREFERRED EMBODIMENTS

Cameras for professional application generate following output streams as Ethernet IP-UDP-RTP jumbo packets:

DPX wrapped video;

AIFF audio, which maintains time relation with the video content;

Intercom audio, which is presented also as AIFF audio, where there is no time relation with the video content.

Metadata packets (if applicable) generated by video camera.

The metadata stream may comprise metadata generated by the camera, or any external metadata (such metadata produced by any web server). These contents may be relevant to camera stream content and may be useful for post-editing.

Figure 1:
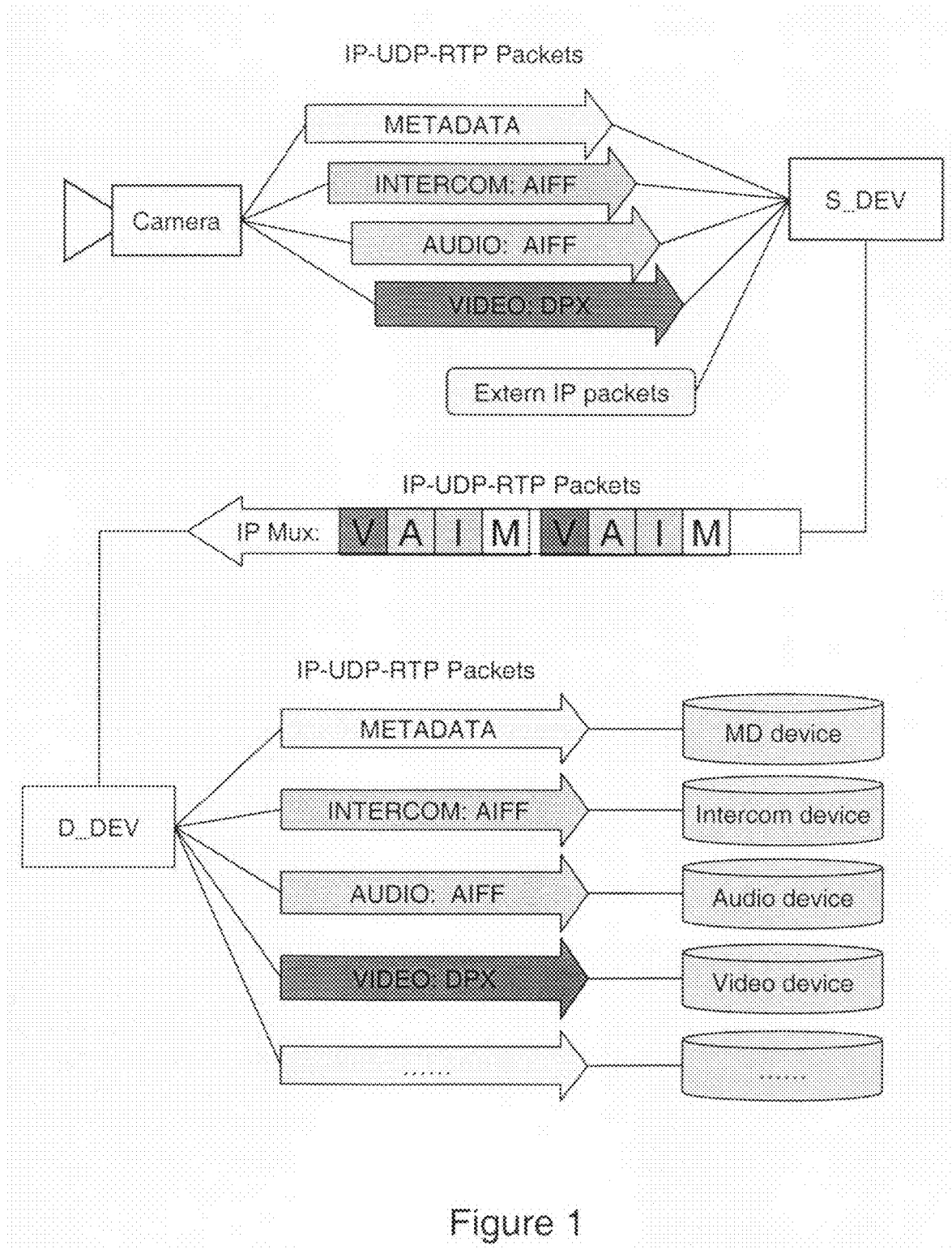
FIG. 1: an overview of the method according to the invention dealing with a combined transport of different types of data on a high-speed IP network.

There is a need to transmit all these data in a combined way to distant device at high speed. A solution to fulfil this need would be to transmit these data on high speed IP network. A method according to the invention for transferring a number n of different types of data in a high speed Internet Protocol network is shown on FIG. 1.

Figure 2:
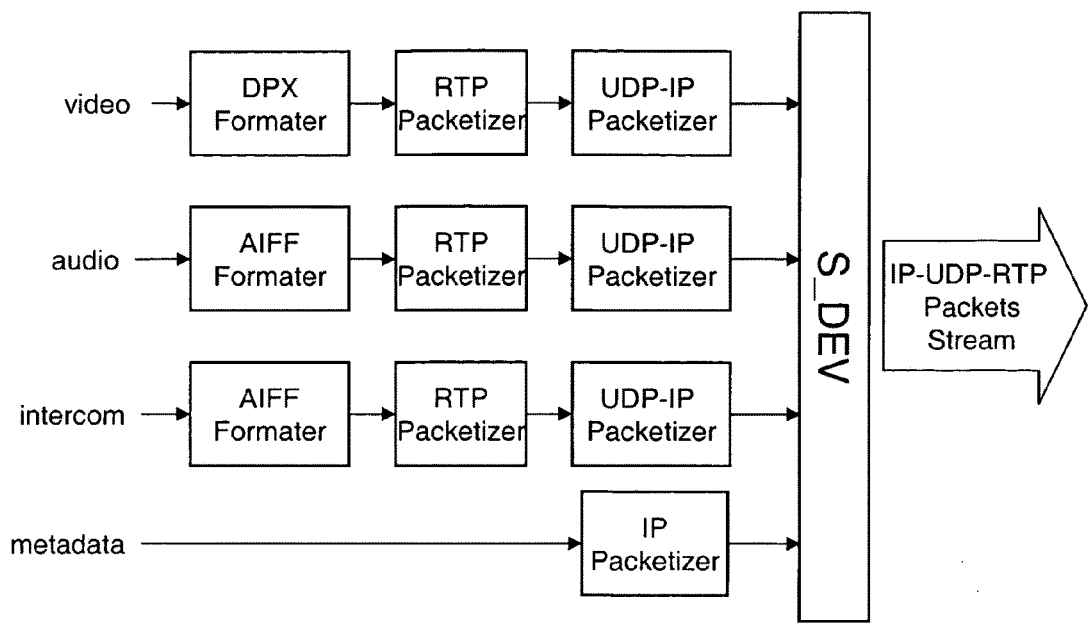
FIG. 2: different types of data generated by a professional Camera.

At a sender side, a source device S_DEV combines all different streams generated by the camera into packets and transmits all packets using a single physical IP transport link. As shown on FIG. 2, only a channel multiplexing is done on the IP packets layer. It means that all original IP-UDP-RTP packets generated by the different media are not changed.

At a receiver side, a destination device D_DEV filters the IP packets and switches them to associated stand-alone processing or storage devices. An IP transport stream can be considered as a transport pipeline, the physical data flow in the pipeline has a single dimension. The process of interleaving the transport stream packets of more than one program into a single unified bit-stream, while maintaining timing synchronization of each program comprised within, is known as "IP multiplexing".

The process of IP multiplexing seems just like to create virtual multiple sub-pipelines in a physical one-dimensional pipeline. In the following section, a possible solution for realizing such virtual sub-pipelines in a single physical pipeline with jumbo packets is given.

Physically, in the physical pipeline it exists only one transport stream pipeline link and no sub-pipeline. Virtual sub-pipeline must be realized through sub-streams multiplexing in the one-dimensional transport stream pipeline. To do such a multiplexing, a transport stream consists of a sequence of multiplexing logical blocks, as shown on FIG. 3. The meaning of each block is a minimal stream unit of the total virtual sub-pipelines in the current physical pipeline.

Figure 3:
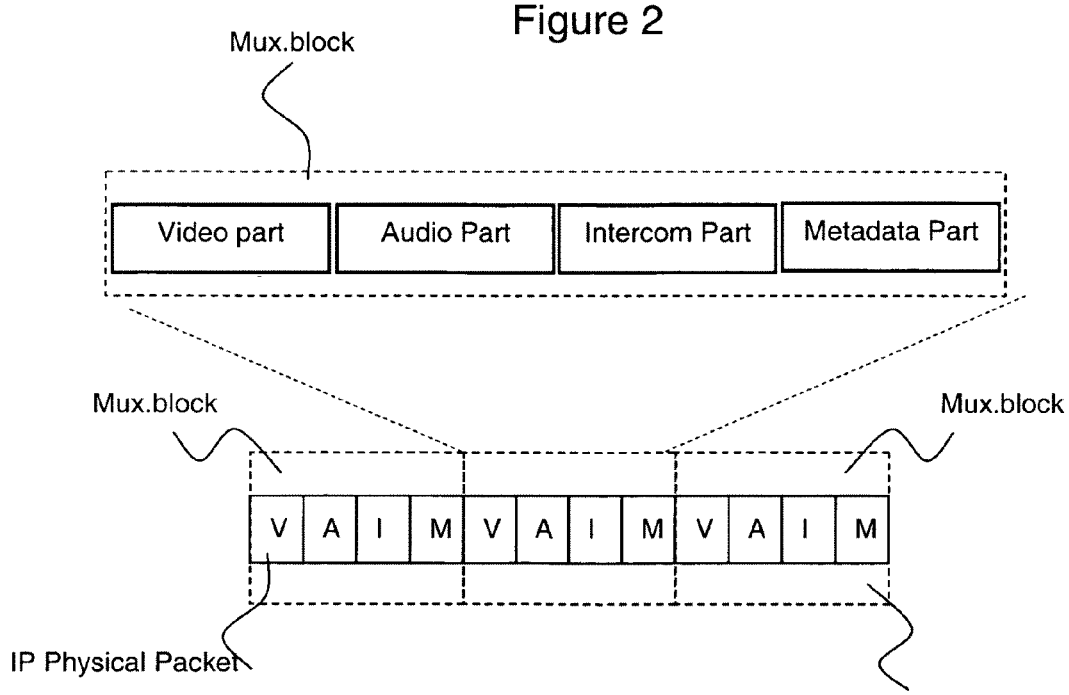
FIG. 3: an example of IP multiplexing logical block structure.

In FIG. 3, each IP multiplexing logical block comprises IP physical packets, which are multiplexed transport packets of video, audio, intercom and others data. In the example presented here, video, audio and intercom streams are real time transported packets, so fixed bits are reserved for them in the multiplexing logical block. Further bits should be aligned in the multiplexing logical block for non-real-time packets, such as, camera generated metadata packets and external packets. A data transport container according to the invention, is used for transferring a number n of different types of data in a high speed Internet Protocol network.

Advantageously, n is equal to 2, data of a first type is a DPX wrapped video content generated by a source and data of a second type is an AIFF audio signal generated by the source, where the AIFF audio signal maintains a time relation with the video content.

Advantageously, n is equal to 3, data of a first type is a DPX wrapped video content generated by a source and data of a second type is an AIFF audio signal generated by the source, where the AIFF audio signal maintains a time relation with the video content, data of a third type is an Intercom audio signal presented as an AIFF audio signal without any time relation with the video content.

Advantageously, n is equal to 4, data of a first type is a DPX wrapped video content generated by a source and data of a second type is an AIFF audio signal generated by the source, where the AIFF audio signal maintains a time relation with the video content, data of a third type is an Intercom audio signal presented as an AIFF audio signal without any time relation with the video content, data of a fourth type is Metadata.

As an example, a description of the specific RTP encapsulation for DPX format is presented first. Then, a description of the specific RTP encapsulation for AIFF format is presented followed by a description of multiplexing step.

Video Packets Encapsulation

FIG. 3 also shows the data structure of a multiplexing block. The multiplexing logical block consists of video part, audio part, intercom part and metadata part. Each source part includes one or a group of IP packet(s), which should be a Minimal Multiplex Unit (MMU) of the source stream. The MMU is one or a group of IP packets, which is the minimal transportable unit of each source packet(s) and must be transmitted together. The structure of MMU should satisfy the buffer restriction of current application. The data structures of MMU for each source stream are discussed below.

Figure 4:
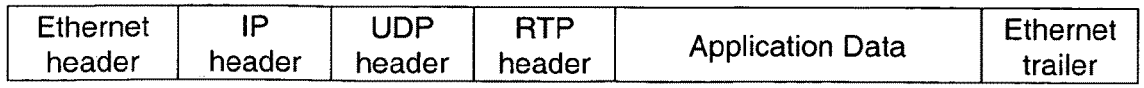
FIG. 4: an example of encapsulation of Ethernet IP-UDP-RTP packet.

FIG. 4 shows the packet data structure. For the application considered as example, data will be DPX data, AIFF data.

Figure 5:
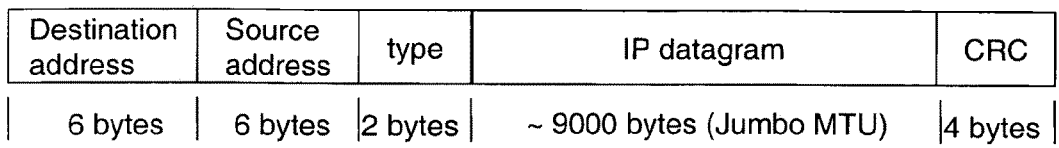
FIG. 5: an example of IP over Ethernet encapsulation.
Figure 6:
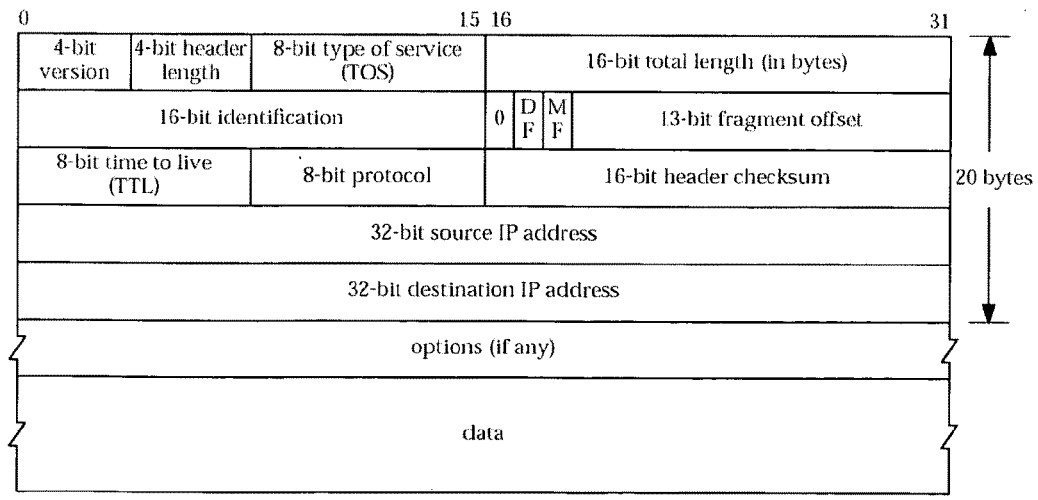
FIG. 6: an IP header.
Figure 7:
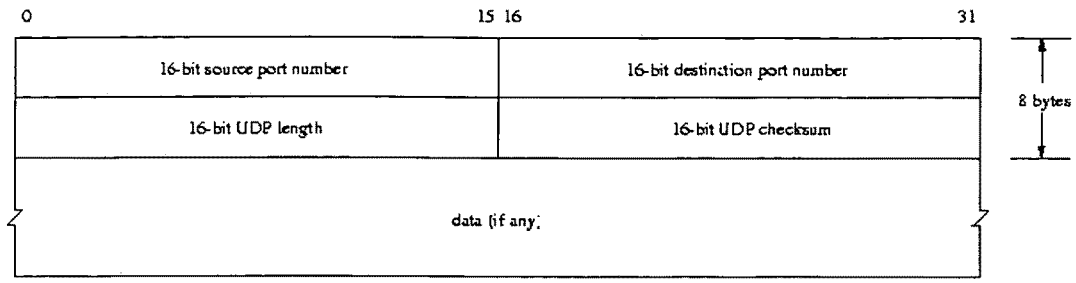
FIG. 7: an UDP header.

FIGS. 5, 6 and 7 show associated header and encapsulation data structure of Ethernet, IP and UDP format. As shown in these data structures, Ethernet header consists of 14 bytes, Ethernet trailer is 4 bytes, standard IP header is 20 bytes, UDP header is 8 bytes.

Figure 8:
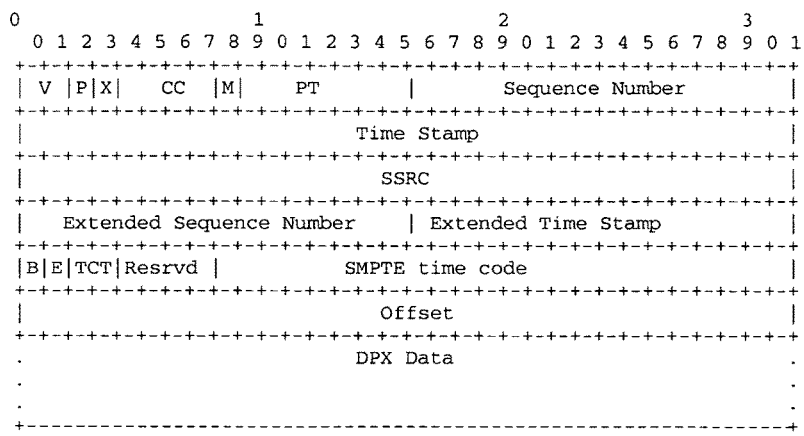
FIG. 8: a DPX over RTP encapsulation.

FIG. 8 shows the specific RTP encapsulation for DPX format. In this case, the standard RTP header (12 bytes) is followed by the DPX payload header (12 bytes). RTP packet comprises DPX frame, which has the same timestamp. Only data of one DPX frame per RTP is allowed.

As specified in SMPTE 268M-2003, each DPX file comprises four sections. The first three sections are header information, the fourth comprises video data. In this usual description, the third section comprises user-defined data and provides an extended area for customized metadata information. This third section will not be used in the application considered as example. In this application, it is proposed not to combine the video information with all the metadata in one DPX packet, but to create two separate streams. One stream consists of DPX packets with generic header information and video information only and Metadata will be loaded in another metadata-only stream.

Figure 9:
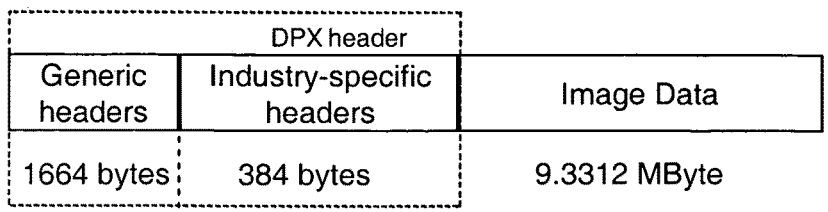
FIG. 9: DPX format structure for video packets only stream.

Considering the case where typical video frame is 1920*1080 pixels, and where each pixel is encoded by 36 bits. Then, the video frame weight is: 1920*1080*36 bits or 74649600 bit or, expressed in Mega-bytes 9.3312 MBytes. A DPX video stream comprising only video data consists of DPX header comprising two sections being header information, an empty third section and a fourth section comprising video frame as shown in FIG. 9 where the third section is not apparent.

Figure 10:
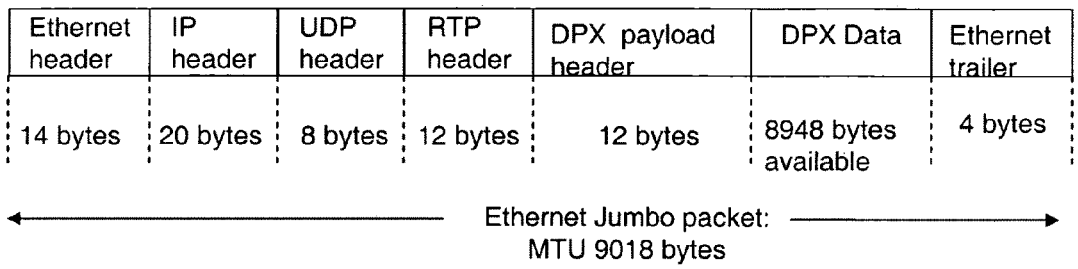
FIG. 10: Ethernet jumbo packet with DPX header payload.

Considering the above described header structures, when an Ethernet jumbo packet (MTU: 9018 bytes) is used to transfer DPX video, the encapsulation data structure for DPX video presented in FIG. 10 can be derived.

Figure 11:
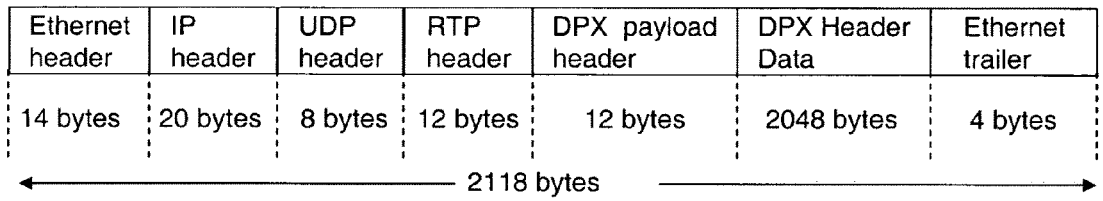
FIG. 11: Ethernet jumbo packet with DPX video line payload.

When using Ethernet jumbo packet to transfer IP-UDP-RTP-DPX packet, the maximal available DPX payload data is 8948 bytes. For transfer a video DPX packet (FIG. 11), the original DPX packet (9.3312 MBytes) must be divided into a series of reduced Ethernet jumbo packet (9018 bytes). For an easy filtering, the DPX header data shown in FIG. 9 is transferred with one separate jumbo packet as shown in FIG. 11. The total size of a DPX header jumbo packet is 2118 bytes.

Figure 12:
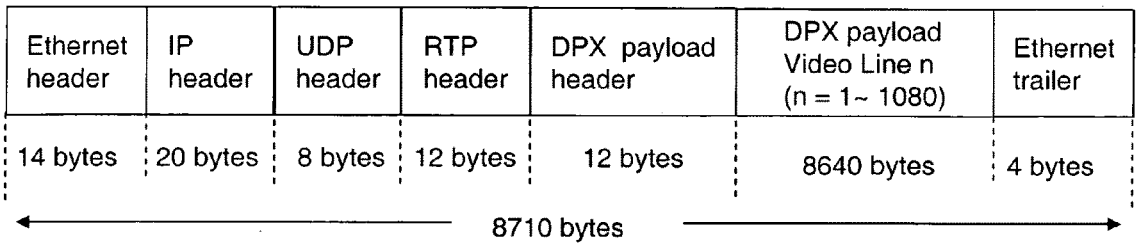
FIG. 12: an AIFF file structure.

It is chosen to packetize each video line of the video frame into a single jumbo packet. Each video line is 1920*36 bits or 8640 bytes. The total video frame is loaded in 1080 packets as shown in FIG. 12. The total size of a DPX video line jumbo packet is 8710 bytes. According to above discussion, a DPX video frame will be transferred as 1081 Ethernet jumbo packets. A first transmitted packet includes a DPX header payload (2118 bytes) and further 1080 transmitted packets are DPX video line payload (each 8710 bytes).

Advantageously, among the aggregated jumbo packets corresponding to the first type of data, one jumbo packet includes a DPX header.

Audio Packets Encapsulation

Figure 13:
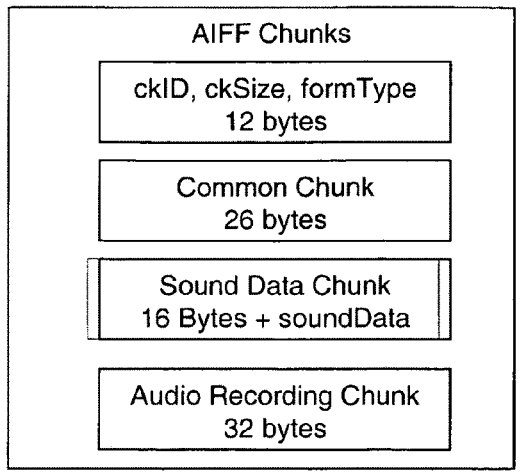
FIG. 13: an AIFF file over RTP encapsulation.

The Audio Interchange File Format (AIFF) standard is used for storing the sample audio channels before wrapping them in RTP. An AIFF file comprises different types of chunks as shown in FIG. 13. Header content, the Common Chunk size and Audio Recording Chunk are predefined. Sound Data Chunk size depends on the size of transferred packet.

In the example shown in FIG. 13, three bytes are used for encoding one channel audio sample and six audio channels are applied, so a sample frame size is 18 bytes. The audio frequency is 48 kHz, the video rate is 24 frames-per-second. During one video frame, it will generate 2000 audio sample frames. If dividing these audio sample frames into 5 packets having each an equal size, each packet comprises 400 sample frames. Because the total audio sample frames during one video frame is 36 kbytes, the audio payload in each packet is equal to 7.2 kbytes. According to the AIFF Form shown on FIG. 13, the Sound Data Chunk will be 7216 bytes and the total AIFF Form will be 7286 bytes.

Figure 14:
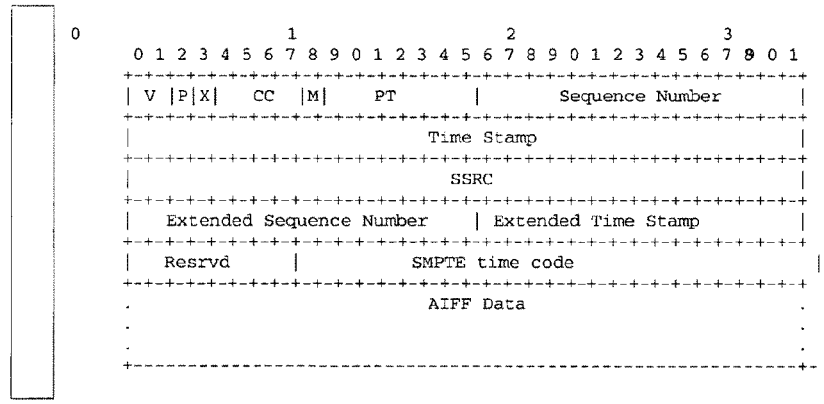
FIG. 14: specific RTP encapsulation for AIFF chunk.
Figure 15:
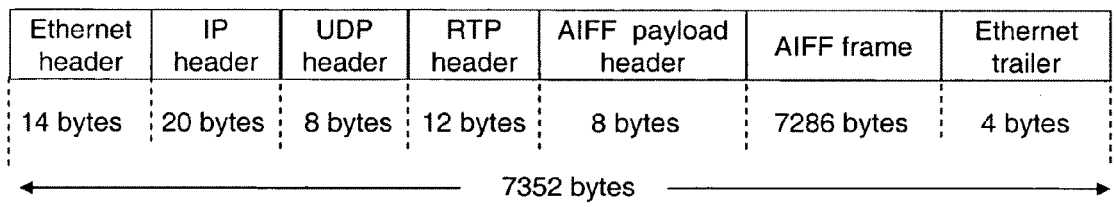
FIG. 15: an Ethernet packet with AIFF chunks payload.

FIG. 14 shows the specific RTP encapsulation for AIFF chunk. In this case, the standard RTP header (12 bytes) is followed by the AIFF payload header (8 bytes). An AIFF chunk must start with a new RTP packet. Above described AIFF Form can be encapsulated with jumbo Ethernet packet (MTU 9018 bytes). The Ethernet IP-UDP-RTP-AIFF packet structure is shown in FIG. 15. The total packet size is 7352 bytes.

Multiplexing

Video packets and audio packets are multiplexed as described hereafter: a DPX file is split up and embedded in Ethernet IP-UDP-RTP packets. The DPX header (exclusive the part of user defined data) shall be transmitted as one separate jumbo packet. After that, a set of 1080 jumbo packets are generated, each comprising one video line of the video frame. These 1081 jumbo packets constitute the Minimal Multiplexing Unit of the DPX video stream. The Minimal-Multiplexing-Unit for audio and intercom source stream consists of 5 Ethernet jumbo packets with AIFF Form payload. For metadata and external data, the Minimal-Multiplexing-Unit consists of a single Ethernet jumbo IP packet.

Figure 16:
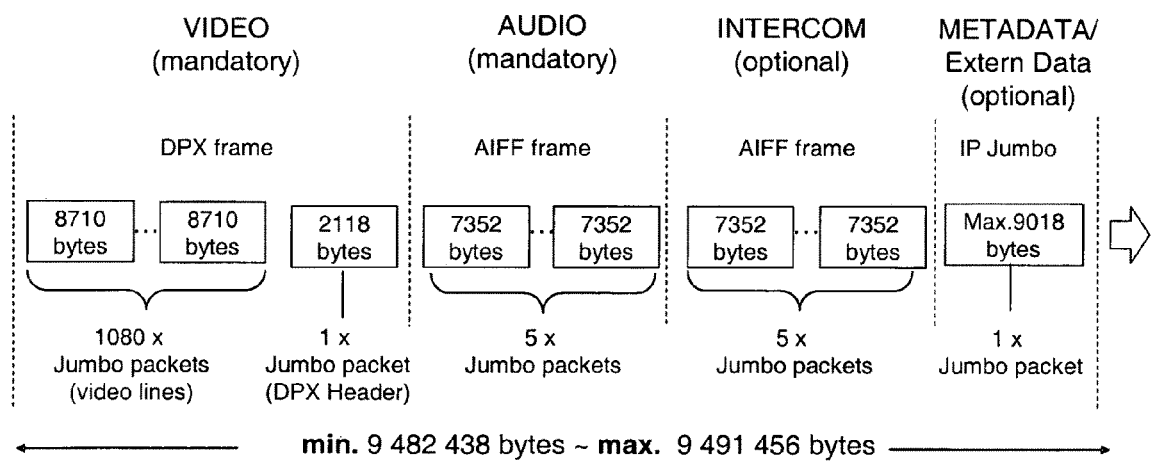
FIG. 16: a multiplexing layout in the data transport container.

FIG. 16 shows a detailed structure of a multiplexing logical block in the transport stream.

The first part in the multiplexing block is the metadata part: it is a jumbo IP metadata packet. Its maximal size is 9 KB. The payload of metadata part can be any intern and external generated metadata. If a big metadata can not be completely loaded in a single jumbo packet, the metadata may be split and loaded into the metadata packet of the next multiplexing block. In the multiplexing block, the metadata packet is optional. If no metadata is presented, the metadata packet is omitted.

The second and third parts in the multiplexing block are intercom and audio parts. Intercom part is constituted with 5 intercom packets and audio part is constituted with 5 audio packets. Intercom and audio packets are both jumbo Ethernet IP packets. They are 7352 bytes with AIFF payload. The intercom packets are optional and the audio packets are mandatory.

In the fourth part (video part), 1081 jumbo video packets are transferred. The average size of a multiplexing block is 9.485 Mbytes.

Also, FIG. 16 shows the final IP multiplexing layout of data transport container according to the invention. In this data transport container, source stream or packet which are presented as IP packets are multiplexed into an Ethernet IP transport stream. The IP transport stream consists of a series of multiplexing logical block being an aggregation of minimal transport unit of a group of source packets video Minimal Multiplexing Unit (MMU), audio MMU, intercom MMU and metadata/external data MMU. Each source signal MMU is the minimal transportable and retrieve-able packet of the source stream. Each MMU is designed according to its source signal format requirement.

References disclosed in the description, the claims and the drawings may be provided independently or in any appropriate combination. Features may, where appropriate, be implemented in hardware, software, or a combination of the two. Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A device comprising a processor and memory, the processor configured to:
    create a data transport container for transferring a number n of different types of data in a high speed Internet Protocol network, the number n being superior or equal to 2, said data being generated as Ethernet Jumbo packets, wherein the data transport container is an Internet Protocol packet, wherein the processor is further configured to generate the data transport container further comprising a succession of Internet Protocol multiplexing logical blocks, each logical block comprises a combination of n Internet Protocol physical packets corresponding to each type of data from said different types of data, and, the processor further configured to enable each Internet Protocol physical packet to aggregate a predefined number of Ethernet Jumbo packets, said predefined number is based on the type of data said Ethernet Jumbo packet comprises.

2. The data transport container according to claim 1, wherein n is equal to 2, data of a first type is a DPX wrapped video content generated by a source and data of a second type is an AIFF audio signal generated by the source, where the AIFF audio signal maintains a time relation with the video content.

3. The data transport container according to claim 1, wherein n is equal to 3, data of a first type is a DPX wrapped video content generated by a source and data of a second type is an AIFF audio signal generated by the source, where the AIFF audio signal maintains a time relation with the video content, data of a third type is an Intercom audio signal presented as an AIFF audio signal without any time relation with the video content.

4. The data transport container according to claim 1, wherein n is equal to 4, data of a first type is a DPX wrapped video content generated by a source and data of a second type is an AIFF audio signal generated by the source, where the AIFF audio signal maintains a time relation with the video content, data of a third type is an Intercom audio signal presented as an AIFF audio signal without any time relation with the video content, data of a fourth type is Metadata.

5. The data transport container according to claim 1, wherein among the aggregated jumbo packets corresponding to the first type of data, one jumbo packet comprises a DPX header.

6. Method for transferring a number n of different types of data in a high speed Internet Protocol network from a source device to a destination device, the number n being superior or equal to 2, each type of data from said different types of data being generated as Ethernet Jumbo packets, wherein said method comprises:
    aggregating by said source device a predefined number of Ethernet Jumbo packets comprising a unique type of data into an Internet Protocol physical packet of corresponding type, wherein the predefined number is based on the type of data;
    combining by said source device together n Internet Protocol physical packet corresponding to each type of data from said different type of data, into an Internet Protocol multiplexing logical block;
    transmitting by said source device a stream comprising the Internet Protocol multiplexing logical blocks on the network;
    receiving the stream by said destination device; and
    filtering by said destination device the received stream in order to recover Ethernet Jumbo packets corresponding to each type of data.

7. The method according to claim 6, wherein n is equal to 2, data of a first type is a DPX wrapped video content generated by a source and data of a second type is an AIFF audio signal generated by the source, where the AIFF audio signal maintains a time relation with the video content.

8. The method according to claim 6, wherein n is equal to 3, data of a first type is a DPX wrapped video content generated by a source and data of a second type is an AIFF audio signal generated by the source, where the AIFF audio signal maintains a time relation with the video content, data of a third type is an Intercom audio signal presented as an AIFF audio signal without any time relation with the video content.

9. The method according to claim 6, wherein n is equal to 4, data of a first type is a DPX wrapped video content generated by a source and data of a second type is an AIFF audio signal generated by the source, where the AIFF audio signal maintains a time relation with the video content, data of a third type is an Intercom audio signal presented as an AIFF audio signal without any time relation with the video content, data of a fourth type is Metadata.

* * * * *